(12) United States Patent
Zeng

(10) Patent No.: US 12,456,736 B2
(45) Date of Patent: Oct. 28, 2025

(54) SODIUM METAL BATTERY AND ELECTROCHEMICAL APPARATUS

(71) Applicant: CONTEMPORARY AMPEREX TECHNOLOGY (HONG KONG) LIMITED, Hong Kong (CN)

(72) Inventor: Yuqun Zeng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/338,530

(22) Filed: Jun. 21, 2023

(65) Prior Publication Data

US 2023/0352695 A1 Nov. 2, 2023

Related U.S. Application Data

(63) Continuation of application No. PCT/CN2022/079758, filed on Mar. 8, 2022.

(51) Int. Cl.
| | |
|---|---|
| *H01M 4/66* | (2006.01) |
| *H01M 4/02* | (2006.01) |
| *H01M 4/38* | (2006.01) |
| *H01M 4/62* | (2006.01) |
| *H01M 10/054* | (2010.01) |

(52) U.S. Cl.
CPC .......... *H01M 4/668* (2013.01); *H01M 4/381* (2013.01); *H01M 4/623* (2013.01); *H01M 4/625* (2013.01); *H01M 4/661* (2013.01); *H01M 4/667* (2013.01); *H01M 10/054* (2013.01); *H01M 2004/021* (2013.01)

(58) Field of Classification Search
CPC ............................. H01M 4/661; H01M 10/054
See application file for complete search history.

(56) References Cited

U.S. PATENT DOCUMENTS

| | | | |
|---|---|---|---|
| 2018/0331387 A1* | 11/2018 | Kovacs | ................. H01M 4/134 |
| 2020/0058922 A1 | 2/2020 | Cohn et al. | |

FOREIGN PATENT DOCUMENTS

| | | |
|---|---|---|
| CN | 105047986 A | 11/2015 |
| CN | 107221640 A | 9/2017 |
| CN | 109155415 A | 1/2019 |
| CN | 109888193 A | 6/2019 |
| CN | 112447936 A | 3/2021 |
| CN | 112531145 A | 3/2021 |
| CN | 112563491 A | 3/2021 |
| CN | 20191080168.2 | 3/2021 |
| CN | 113451546 A | 9/2021 |
| JP | 2013114789 A | 6/2013 |
| JP | 2019508856 A | 3/2019 |
| WO | 2018151674 A1 | 8/2018 |

OTHER PUBLICATIONS

Nanda et al. "Anode-Free Full Cells: A Pathway to High-Energy Density Lithium-Metal Batteries", Adv. Energy Mater. 2021, 11, 2000804. (Year: 2020).*
Zhao et al., "Moving to Aqueous Binder: A Valid Approach to Achieving High-Rate Capability and Long-Term Durability for Sodium-ion Battery", Adv. Sci., 2018, 5, 1700768 (8 pages), published Jan. 20, 2018.
Cohn et al., "Rethinking sodium-ion anodes as nucleation layers for anode-free batteries", J. Mater. Chem, 2018, 6, 23875 to 23884 (10 pages), published Nov. 5, 2018, plus Electronic Supplementary Information, pp. 1 to 17.
Nguyen and Kuss, "Review—Conducting Polymer-Based Binders for Lithium-Ion Batteries and Beyond", Journal of the Electrochemical Society, 2020, 167, 065501 (15 pages), published Apr. 14, 2020.
Yun et al., "Low Resistance Flexible Current Collector for Lithium Secondary Battery", Electrochemical and Solid-State Letters, 14 (8) A116-A119 (2011), published Jun. 3, 2011.
Wenzi H., "Batteries: Capacity", Encyclopedia of Electrochemical Power Sources, edited by Jürgen Garche et al., Elsevier B.V., 2009, p. iv and pp. 395-397.
An English machine translation of the second Office Action issued by the China National Intellectual Property Administration (CNIPA) on Dec. 9, 2021 for Chinese Patent Application No. 202110742607.7 (published as CN 113 451 546 A and assigned to Contemporary Amperex Tech Co) to which US'530 claims priority.
First Chinese office action dated Sep. 25, 2023 for Application No. CN 202210396007.4.
Adam P.Cohn et al., "Rethinking sodium-ion anodes as nucleation layers for anode-free batteries", Journal of Materials Chemistry A, pp. 1-17.
Adam P.Cohn et al., "Rethinking sodium-ion anodes as nucleation layers for anode-free batteries", Journal of Materials Chemistry A, Nov. 5, 2018, pp. 23875-23884.
Jin Ho Yun, et al., "Low Resistance Flexible Current Collector for Lithium Secondary Battery", Electrochemical and Solid-State Letters, Jan. 3, 2011, pp. A116-A119.

(Continued)

*Primary Examiner* — Stephan J Essex
(74) *Attorney, Agent, or Firm* — K&L Gates LLP

(57) ABSTRACT

A sodium metal battery and an electrochemical apparatus, the battery has a positive electrode sheet and a negative electrode sheet, the negative electrode sheet being a negative electrode current collector, and a sodium layer deposited in situ on the negative electrode current collector having a thickness of ≥30 nm after the battery is charged and discharged for the first time. After the battery cell is charged and discharged for the first time, the amount of residual sodium metal is sufficient to uniformly form a sodium deposition layer with a certain thickness on the surface of the negative electrode current collector. The higher nucleation energy required for the deposition of sodium onto the surface of the current collector during subsequent charge-discharge cycles is avoided, the overall deposition overpotential is reduced, and the deposition uniformity of sodium metal and the reversibility of the charge-discharge process are ensured.

8 Claims, No Drawings

(56) References Cited

OTHER PUBLICATIONS

Jing Zhao, et al., "Moving to Aqueous Binder: A Valid Approach to Achieving High-Rate Capability and long-Term Durability for Sodium-Ion Battery", Advanced Science, Jan. 20, 2018, 8 pages.
Van At Nguyen, et al., "Review-Conducting Polymer-Based Binders for Lithium-Ion Batteries and Beyond", Journal of the Electrochemical Society, Apr. 14, 2020, 15 pages.
Observation by third party dated Jan. 5, 2024 for Application No. PCT/CN2022079758, 18 pages.
JP third party observation dated Mar. 2023 for Application No. PCT/CN2022079758, 15 pages.
Notification to Grant dated Feb. 27, 2024 for Application No. CN 202210396007.4.
International Search Report dated Apr. 25, 2022 for Application No. PCT/CN2022/079758.
First Chinese office action dated Oct. 27, 2021 for Application No. CN 202110742607.7.
Second Chinese office action dated Dec. 9, 2021 for Application No. CN 202110742607.7.
Notification to Grant Patent dated Feb. 16, 2022 for Application No. CN 202110742607.7.
Liu. Shan et al. "Porous Al Current Collector for Dendrite-Free Na Metal Anodes", Nano Letters, vol. 17, Aug. 10, 2017 (Aug. 10, 2017), ISSN: 1530-6984, pp. 5862-5868.
Lu, Yanying et al. "Stable Na plating/stripping electrochemistry realized by a 3D Cu current collector with thin nanowires", Chern. Commun., vol. 53, Nov. 7, 2017 (Nov. 7, 2017), ISSN: 1359-7345, pp. 12910-12913.
Japanese office action dated Jun. 6, 2024 for application JP 2023-528483.
Saengprajak, Arnusorn. "Efficiency of demand side management measures in small village electrification systems." Kassel Kassel Univ. Press, 2006, p. 30.
Wang, W., & Soper, S.A. (Eds.). (2006). Bio-MEMS: Technologies and Applications (1st ed.). CRC Press. https://doi.org/10.1201/9781420018677, p. 61.
Nanda, Sanjay, Abhay Gupta, and Arumugam Manthiram. "Anode-free full cells: a pathway to high-energy density lithium-metal batteries." Advanced Energy Materials 11.2 (2021): 2000804, 18 pages.
EP Application No. EP22827057.5, EP-2nd-third party submission document, Dec. 23, 2024, 11 pages.
Extended European Search Report dated Oct. 14, 2024 for application EP 22827057.5.
Notice of Reasons for Refusal dated Dec. 24, 2024 for application JP 2023-528483.

* cited by examiner

SODIUM METAL BATTERY AND ELECTROCHEMICAL APPARATUS

CROSS-REFERENCE TO RELATED APPLICATIONS

The present application is a continuation of International application PCT/CN2022/079758 filed on Mar. 8, 2022 that claims the priority of Chinese Patent Application No. 202110742607.7 filed on Jun. 26, 2021, entitled "SODIUM METAL BATTERY AND ELECTROCHEMICAL APPARATUS" The entire contents of both applications are incorporated herein by reference.

TECHNICAL FIELD

The present application relates to the technical field of sodium batteries, and in particular to a sodium metal battery and an electrochemical apparatus.

BACKGROUND

With the gradual expansion of the application of lithium-ion battery technology in consumer electronics, electric vehicles, energy storage and other markets, the problem of insufficient lithium resources has also begun to emerge. Since the earth has a sufficiently high abundance of sodium elements, sodium-based batteries are gradually gaining attention and are strategically important in cost-critical applications such as energy storage. Due to the higher reduction potential and larger relative molecular mass of sodium metal compared with lithium metal, the energy density of sodium-ion battery with similar working principle decreases significantly compared with that of lithium-ion battery; the intercalation and deintercalation of sodium ions on the positive electrode and negative electrode are accompanied by a larger volume expansion due to their larger ionic radius, resulting in a decrease in the cycle reversibility of the battery, which significantly restricts the application and promotion of sodium-ion batteries. With the development of electrolyte and its additive technology and surface modification technology, the problem of sodium dendrite growth caused by uneven deposition on the metal surface, which has long plagued the academic community, has been significantly improved, and the safety performance of the product is expected to be significantly enhanced, which makes the sodium metal negative electrodes with high energy densities re-enter people's vision.

In order to further obtain a higher energy density of the battery cell, a "non-negative electrode" sodium metal battery has been developed by in situ deposition of sodium deintercalated from the positive electrode material to the negative electrode current collector. At the same time, the negative electrode side does not need to be pre-coated/deposited with highly reactive sodium metal, which greatly improves the fabrication feasibility and safety of the battery cell. However, the deposition of non-negative electrode sodium metal batteries on the surface of the negative electrode current collector requires a higher overpotential, which also easily leads to uneven sodium deposition, aggravates the side reaction with the electrolyte solution, greatly consumes active sodium, and ultimately affects the cycling performance of the battery cell.

SUMMARY OF THE INVENTION

In view of this, in order to overcome the above-mentioned defects, the present application provides a sodium metal battery and an electrochemical apparatus, in which the sodium metal may form a uniform sodium deposition layer on the surface of the negative electrode current collector during the charge-discharge process to ensure the reversibility of the charge-discharge process.

In a first aspect, the present application provides a sodium metal battery, comprising a positive electrode sheet and a negative electrode sheet, said negative electrode sheet being a negative electrode current collector, and the sodium layer deposited in situ on the negative electrode current collector having a thickness of ≥30 nm after the battery is charged and discharged for the first time.

In the above technical solution, in the sodium metal battery according to the present application, the negative electrode active material is formed in situ by the deposition of sodium deintercalated from the positive electrode, after the battery cell is charged and discharged for the first time, there will be some sodium metal remaining on the negative electrode side and not returning to the positive electrode due to the incomplete reversibility of the deintercalation/intercalation of sodium from the positive electrode active material for the first time. Due to the inhomogeneity of the surface of the negative electrode current collector and the highly active reaction between the sodium metal and the electrolyte solution, when the total amount of residual metal sodium is low, its distribution on the surface of the current collector shows obvious inhomogeneity, and the area with active sodium residue is more likely to deposit sodium metal in the subsequent charge process due to its lower nucleation energy (corresponding to low deposition overpotential) than the area without sodium residue, which will further aggravate the problem of inhomogeneous sodium deposition and eventually lead to the intensification of the side reaction between the highly active area (tip and dendrite area) and electrolyte solution, which eventually leads to the consumption of active sodium and the degradation of battery performance. This application utilizes the first irreversible capacity of the positive electrode material and the optimization of the battery cell design. After the battery cell is charged and discharged for the first time, the amount of residual sodium metal is sufficient to uniformly form a sodium deposition layer with a certain thickness on the surface of the current collector. The higher nucleation energy required for the deposition of sodium onto the surface of the current collector during subsequent charge-discharge cycles is avoided, the overall deposition overpotential is reduced, and the deposition uniformity of sodium metal and the reversibility of the charge-discharge process are ensured. Specifically, after the battery cell is charged and discharged for the first time, the sodium deposition thickness of the negative electrode is required to be ≥30 nm.

In some optional embodiments, the initial charge capacity and the initial discharge capacity of the positive electrode active material in the positive electrode sheet are $Q_C$ mAh/g and $Q_D$ mAh/g, the coating mass of the positive electrode active material is $C_W$ g/cm², and the theoretical volumetric gram capacity of sodium metal is X mAh/cm³, which satisfy the following formula:

$$300 \le \frac{(Q_C - Q_D) * C_W}{X} * 10^7 \le 5000. \qquad (I)$$

In some optional embodiments, the negative electrode current collector comprises an aluminum-based current collector comprising at least one of the following technical features:

(1) the aluminum-based current collector comprises at least one of aluminum foil or aluminum alloy foil;

(2) the aluminum-based current collector is an aluminum-based composite current collector comprising a polymer base film and aluminum foil and/or aluminum alloy foil formed on both sides of the polymer base film;

(3) the aluminum-based current collector is an aluminum-based composite current collector comprising a polymer base film and aluminum foil and/or aluminum alloy foil formed on both sides of the polymer base film, and the polymer base film is any one of polyamide, polyterephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenolic resin, polytetrafluoroethylene, polyvinylidene fluoride, silicone rubber, and polycarbonate; and (4) the surface roughness of the aluminum-based current collector is 0.3 μm to 1.5 μm. In some optional embodiments, at least part of the surface of the negative electrode current collector is provided with a conductive coating comprising a conductive agent and a binder, the conductive agent comprising at least one of metal, conductive carbon, conductive polymer, and conductive ceramic material.

In some optional embodiments, the conductive coating comprises at least one of the following technical features:

(5) the metal has a body-centered cubic structure, and the metal comprises any one of α-Fe, V, Nb, Cr, Mo, Ta, and W;

(6) the conductive carbon comprises at least one of conductive carbon black, graphite, carbon fiber, single-walled carbon nanotube, multi-walled carbon nanotube, graphene, and fullerene;

(7) the conductive polymer comprises any one of polyaniline, polythiophene, polypyrrole, and polyphenylacetylene;

(8) the conductive ceramic material comprises at least one of $TiB_2$, $TiC$, and $B_4C_3$;

(9) the binder comprises any one of polyvinylidene fluoride, sodium carboxymethyl cellulose, styrene butadiene rubber, sodium alginate, lithium polyacrylate, sodium polyacrylate, polytetrafluoroethylene, polyimide, and polyurethane; and

(10) the mass ratio of the binder to the conductive agent is 1:(1 to 30).

In some optional embodiments, the conductive coating has a thickness of 1 μm to 10 μm.

In some optional embodiments, the conductive coating may be formed by any one of transfer coating, extrusion coating, and spray coating.

In some optional embodiments, the positive electrode active material comprises at least one of a sodium transition metal oxide, a polyanionic compound, and a Prussian blue compound.

In some optional embodiments, the battery has a first coulomb efficiency of 80% to 99%.

In a second aspect, the present application provides an electrochemical apparatus comprising a sodium metal battery according to the first aspect.

The present application achieves the following beneficial effects:

(1) the present application utilizes the first irreversible capacity of the positive electrode material and the optimization of the battery cell design. After the battery cell is charged and discharged for the first time, the amount of residual sodium metal is sufficient to uniformly form a sodium deposition layer with a certain thickness on the surface of the current collector. The higher nucleation energy required for the deposition of sodium onto the surface of the current collector during subsequent charge-discharge cycles is avoided, the overall deposition overpotential is reduced, and the deposition uniformity of sodium metal and the reversibility of the charge-discharge process are ensured; and (2) the present application may further reduce the overpotential required for sodium deposition and ensure the uniformity of sodium metal deposition by providing a conductive coating on the surface of the negative electrode current collector.

DETAILED DESCRIPTION

The following description is optional implementation of the embodiments of the present application. It should be noted that for those of ordinary skill in the art, without departing from the principles of the embodiments of the present application, a number of improvements and embellishments may be made, which should also be considered as the protection scope of the embodiments of the present application.

The terms used in the embodiments of the present application are only for the purpose of describing specific embodiments, and are not intended to limit the present application. As used in the embodiments of application and the appended claims, the singular forms "a," "said," and "the" are intended to comprise the plural forms as well, unless the context clearly dictates otherwise.

An embodiment of the present application provides a sodium metal battery, the battery may comprise at least one of a soft pack, a square aluminum case, a square steel case, a cylindrical aluminum case, and a cylindrical steel case, and the battery comprises a positive electrode sheet and a negative electrode sheet, said negative electrode sheet being an aluminum-based current collector, and the sodium layer deposited in situ on the aluminum-based current collector having a thickness of ≥30 nm after the battery is charged and discharged for the first time.

In the above technical solution, the sodium metal battery of the present application does not need to be provided with the negative electrode active material, and the negative electrode active material is formed in situ by the deposition of sodium deintercalated from the positive electrode. After the battery cell is charged and discharged for the first time, there will be some sodium metal remaining on the negative electrode side and not returning to the positive electrode due to the incomplete reversibility of the deintercalation/intercalation of sodium from the positive electrode active material for the first time. Due to the inhomogeneity of the surface of the negative electrode current collector and the highly active reaction between the sodium metal and the electrolyte solution, when the total amount of residual metal sodium is low, its distribution on the surface of the negative electrode current collector shows obvious inhomogeneity, and the area with active sodium residue is more likely to deposit sodium metal in the subsequent charge process due to its lower nucleation energy (corresponding to low deposition overpotential) than the area without sodium residue, which will further aggravate the problem of inhomogeneous sodium deposition and eventually lead to the intensification of the side reaction between the highly active area (tip and dendrite area) and electrolyte solution, which eventually leads to the consumption of active sodium and the degradation of battery performance. This application utilizes the first irreversible capacity of the positive electrode material and the optimization of the battery cell design. After the battery cell is charged and discharged for the first time, the amount of residual sodium metal is sufficient to uniformly form a sodium deposition layer with a certain thickness on the surface of the current collector. The higher nucleation energy required for the deposition of sodium onto the surface of the current collector during subsequent charge-discharge cycles is avoided, the overall deposition overpotential is reduced, and the deposition uniformity of sodium metal and the reversibility of the charge-discharge process are ensured. The thickness of the sodium deposition layer is ≥30 nm, specifically, the thickness of the sodium deposition layer may be, without limitation, 30 nm, 31 nm, 32 nm, 33 nm, 34 nm, 35 nm, 36 nm, 37 nm, 38 nm, 39 nm, 40 nm, etc. The thickness of the sodium deposition layer is greater than or equal to 30 nm, which may meet the demand for the amount of sodium deposited in the negative electrode, and also meet the partial sodium consumption due to the by-products formed by the reaction between the negative electrode sodium metal and the electrolyte solution.

In some embodiments, the initial t charge capacity and the initial discharge capacity of the positive electrode active material in the positive electrode sheet are $Q_C$ mAh/g and $Q_D$ mAh/g, the coating mass of the positive electrode active material is $C_W$ g/cm², and the theoretical volumetric gram capacity of sodium metal is X mAh/cm³, which may satisfy the following formula:

$$300 \leq \frac{(Q_C - Q_D) * C_W}{X} * 10^7 \leq 5000 (I).$$

In the above formula (I), the theoretical volume gram capacity of sodium metal is X mAh/cm³=1166 mAh/g*0.97 g/cm³, 1166 mAh/g is the theoretical reversible gram capacity of sodium metal, 0.97 g/cm³ is the theoretical density of sodium metal, and $10^7$ is the unit conversion of cm and nm. By controlling the initial charge-discharge capacity and coating mass of the positive electrode material within the above-mentioned ranges, sufficient sodium may remain on the negative electrode side after the battery cell is charged and discharged for the first time, and the partial sodium consumption due to the formation of by-products from the reaction with the electrolyte solution is also considered in advance. When the above battery cell design value is less than 300 nm, the active sodium remaining on the surface of the negative electrode current collector after the initial charge-discharge cycle is not enough to completely cover the surface of the current collector; and when the above battery cell design value is greater than 5000 nm, either the first coulomb efficiency of the positive electrode material is low or the coating mass of the material is too high, the former is not conducive to the energy density of the battery cell, and the latter is not conducive to the final cycling performance of the battery cell due to problems such as powder dropping and poor wettability generated by over-thick sheet, both of which are less practical.

In some embodiments, the initial coulombic efficiency of the battery may be 80% to 99%. When the initial coulombic efficiency of the battery is >99%, the first irreversible capacity of the positive electrode material is low, in order to achieve the sufficient sodium deposition thickness on the negative electrode side after the initial charge-discharge cycle, the coating weight of the positive electrode material is required to be too large, and the problems such as powder dropping and brittle sheet after cold pressing are easy to occur in the battery cell production and processing, which are not conducive to the batch preparation of the battery cell. When the initial coulombic efficiency of the battery is <80%, the first irreversible capacity of the positive electrode material is too large, the reversible capacity of the material is low, and the energy density of the battery cell is low, greatly reducing the practicality.

In some embodiments, the negative electrode current collector used in the negative electrode sheet may comprise at least one of metal foil current collector, metal foam current collector, metal mesh current collector, carbon felt current collector, carbon cloth current collector, and carbon paper current collector. Sodium ions do not form alloys with aluminum, and aluminum-based current collectors may be used for cost reduction and weight reduction. The aluminum-based current collector may be any one of an aluminum foil current collector, an aluminum alloy foil current collector, and an aluminum-based composite current collector. The aluminum-based composite current collector may comprise a polymer base film and aluminum foil and/or aluminum alloy foil formed on both sides of the polymer base film. Optionally, the aluminum-based composite current collector is a "sandwich" structure with the polymer base film in the middle and the aluminum foil on both sides, or the polymer base film in the middle and the aluminum alloy foil on both sides, or the aluminum foil on one side of the polymer base film and the aluminum alloy foil on the other side of the polymer base film. The polymer base film may be any one of polyamide, polyterephthalate, polyimide, polyethylene, polypropylene, polystyrene, polyvinyl chloride, acrylonitrile-butadiene-styrene copolymer, polybutylene terephthalate, poly-p-phenylene terephthalamide, ethylene propylene rubber, polyformaldehyde, epoxy resin, phenolic resin, polytetrafluoroethylene, polyvinylidene fluoride, silicone rubber, and polycarbonate. Optionally, the aluminum-based composite current collector selected by the present application has a better ductility, which is beneficial to maintain the integrity of the electrode during the sodium deposition/stripping process.

In some embodiments, the surface roughness of the aluminum-based current collector may be 0.3 µm to 1.5 µm, specifically, the surface roughness of the aluminum-based current collector may be, without limitation, 0.3 µm, 0.4 µm, 0.5 µm, 0.6 µm, 0.7 µm, 0.8 µm, 0.9 µm, 1.0 µm, 1.0 µm, 1.2 µm, 1.3 µm, 1.4 µm, 1.5 µm, etc. The surface roughness of the aluminum-based current collector is controlled within the above range to ensure that the deposited sodium has a good bond with the aluminum-based current collector. When the roughness is less than 0.3 µm, the surface of the aluminum-based current collector is too smooth, the bond between the deposited sodium and the aluminum-based current collector is insufficient, stripping and powder dropping are easy to occur during use, and loss of contact with the conductive network leads to electrical insulation, affecting the capacity and cycle life of the battery cell; when the roughness is greater than 1.5 µm, uneven deposition of sodium is easy to occur in the local and highly active tip sites, which is more likely to form dendrites, leading to the safety risk of the battery cell.

In some embodiments, at least part of the surface of the negative electrode current collector is provided with a conductive coating, the conductive coating may comprise a conductive agent and a binder, and the conductive agent may comprise at least one of metal, conductive carbon, conductive polymer, and conductive ceramic material. In the present application, a conductive coating is provided on the surface of the negative electrode current collector. When the separator between the positive electrode and the negative electrode is broken, the negative electrode current collector is connected to the positive electrode current collector through a short circuit of the conductive coating, thus preventing a short circuit inside the battery cell that leads to thermal runaway, and the energy inside the battery cell may be consumed quickly by using the short circuit connection of the conductive coating between the negative electrode current collector and the positive electrode current collector to avoid thermal runaway of the battery cell. Moreover, the conductive coating may reduce the contact resistance between the sodium metal and the negative electrode current collector, improve the force between the sodium metal and the negative electrode current collector, and avoid the stripping of the sodium metal layer. The thickness of the conductive coating may be 1 μm to 10 μm, specifically, the thickness of the conductive coating may be, without limitation, 1 μm, 2 μm, 3 μm, 4 μm, 5 μm, 6 μm, 7 μm, 8 μm, 9 μm, 10 μm, etc. If the thickness is greater than 10 μm, there will be a certain loss of energy density. If the thickness of the conductive coating is less than 1 μm, the coating is not uniformly distributed and does not play a corresponding role.

The conductive coating may be a metal layer, the metal may have a body-centered cubic structure, and the metal may comprise any one of α-Fe, V, Nb, Cr, Mo, Ta, and W. The conductive carbon may comprise at least one of conductive carbon black, graphite, carbon fiber, single-walled carbon nanotube, multi-walled carbon nanotube, graphene, and fullerene. The conductive polymer may any one of polyaniline, polythiophene, polypyrrole, and polyphenylacetylene. The conductive ceramic material may comprise at least one of $TiB_2$, TiC, and $B_4C_3$.

The binder may comprise any one of polyvinylidene fluoride, sodium carboxymethyl cellulose, styrene butadiene rubber, sodium alginate, lithium polyacrylate, sodium polyacrylate, polytetrafluoroethylene, polyimide, and polyurethane. The mass ratio of the binder to the conductive agent may be 1:(1-30), specifically, the mass ratio of the binder to the conductive agent may be, without limitation, 1:1, 1:5, 1:10, 1:15, 1:20, 1:25, 1:30, etc. If the binder is too little, the conductive coating is easy to strip. If the binder is too much, the bond between the aluminum-based current collector and the sodium metal becomes poor. The conductive coating prepared from the binder and the conductive agent may not only reduce the resistance, but also enhance the bond between the aluminum-based current collector and sodium metal to further reduce the overpotential of sodium deposition, thereby improving the cycling performance of the battery cell.

The conductive materials such as metal and conductive ceramics may be selected for the conductive coating. The conductive material may partially cover the surface of the aluminum-based current collector, or fully cover the surface of the aluminum-based current collector. The conductive coating may not only reduce the resistance, but also enhance the bond between the aluminum-based current collector and sodium metal. The conductive coating may be formed by any one of transfer coating, extrusion coating, and spray coating. Specifically, the preparation method of the conductive coating may be as follows: adding the binder and the conductive agent into water as a solvent according to the preset ratio and stirring for 6 to 8 h to obtain a conductive slurry, coating the conductive slurry on the perforated current collector using a gravure coater and drying to obtain the conductive coating.

In some embodiments, the positive electrode active material comprises at least one of a sodium transition metal oxide, a polyanionic compound, and a Prussian blue compound. In the sodium transition metal oxide, the transition metal may be one or more of Mn, Fe, Ni, Co, Cr, Cu, Ti, Zn, V, Zr and Ce, and the sodium transition metal oxide may be, for example, $Na_xMO_2$, where M may be one or more of Ti, V, Mn, Co, Ni, Fe, Cr and Cu, and $0<x\leq1$. The polyanionic compound comprises one or more of sodium vanadium trifluorophosphate $Na_3V_2(PO_4)_2F_3$, sodium vanadium fluorophosphate $NaVPO_4F$, sodium vanadium phosphate $Na_3V_2(PO_4)_3$, $Na_4Fe_3(PO_4)_2P_2O_7$, $NaFePO_4$ and $Na_3V_2(PO_4)_3$. The Prussian blue compound is $Na_xM^1M^2(CN)_6$, wherein $M^1$ and $M^2$ are one or more of Fe, Mn, Co, Ni, Cu, Zn, Cr, Ti, V, Zr and Ce, where $0<x\leq2$.

The binder and/or conductive agent may also be added to the positive electrode active material. There is no limitation on the type of the conductive agent, and it may be selected by those skilled in the art according to actual requirements. For example, the above-mentioned binder may be one or more of polyvinylidene fluoride (PVDF), polytetrafluoroethylene (PTFE), polyacrylic acid (PAA), polyvinyl alcohol (PVA), and styrene butadiene rubber (SBR), and the above-mentioned conductive agent may be one or more of graphite, superconducting carbon, acetylene black, carbon black, carbon nanotube, graphene and carbon nanofiber.

There is no limitation on the material of the positive electrode current collector, and it may be selected by those skilled in the art according to actual requirements. Preferably, a metal may be used, which may comprise, for example, but is not limited to, aluminum foil.

The positive electrode sheet is prepared according to the conventional method in the art. Generally, the positive electrode active material, optional conductive agent and binder may be dispersed in a solvent, which may usually be selected from N-methylpyrrolidone (NMP), to form a uniform positive electrode slurry, the positive electrode slurry is coated on at least one surface of the positive electrode current collector, and the positive electrode sheet is obtained after drying and cold pressing.

Further, the electrochemical apparatus may further comprise a separator, and a separator is provided between the positive electrode and the negative electrode to prevent short circuit. There is no particular limitation on the material and shape of the separator, and it may be selected by those skilled in the art according to actual requirements.

In some embodiments, the separator may comprise a substrate layer, and the substrate layer may be a non-woven fabric, a membrane or a composite membrane with a porous structure. In some embodiments, the material of the substrate layer may comprise at least one of polyethylene, polypropylene, polyethylene terephthalate, and polyimide. In some embodiments, the material of the substrate layer may comprise polypropylene porous membrane, polyethylene porous membrane, polypropylene non-woven fabric, polyethylene non-woven fabric or polypropylene-polyethylene-polypropylene porous composite membrane.

In some embodiments, at least one surface of the substrate layer is provided with a surface treatment layer. In some embodiments, the surface treatment layer may be a polymer layer, an inorganic layer, or a layer formed by mixing a polymer with an inorganic substance. In some embodiments, the polymer layer comprises a polymer, and the material of the polymer comprises at least one of polyamide, polyacrylonitrile, polyacrylate, polyacrylic acid, polyacrylic salt, polyvinylpyrrolidone, polyethylene ether, polyvinylidene fluoride, and poly(vinylidene fluoride-hexafluoropropylene).

In some embodiments, the inorganic layer may comprise an inorganic particle and a binder. In some embodiments, the inorganic particle may comprise one or more of aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide, and barium sulfate, or a combination thereof.

In some embodiments, the binder may comprise one or more of polyvinylidene fluoride, copolymers of vinylidene fluoride-hexafluoropropylene, polyamides, polyacrylonitrile, polyacrylate, polyacrylic acid, polyacrylic salt, polyvinylpyrrolidone, polyethylene ether, polymethyl methacrylate, polytetrafluoroethylene, and polyhexafluoropropylene, or a combination thereof.

Further, the electrochemical apparatus may further comprise an electrolyte solution, and the electrolyte solution may comprise a sodium salt and an organic solvent. Specifically, the organic solvent in the electrolyte solution is not particularly limited, and the organic solvent may be an organic solvent commonly used for the electrolyte solution in the art. As an example, the organic solvent may be selected from at least one of ethylene carbonate, propylene carbonate, diethyl carbonate, dimethyl carbonate, ethyl methyl carbonate, propylene carbonate, methyl acetate, ethyl propionate, fluorinated vinyl carbonate, ethyl ether, diethylene glycol dimethyl ether, triethylene glycol dimethyl ether, tetraethylene glycol dimethyl ether, and methyl tert-butyl ether, and an ether solvent may be preferred for regulating the sodium-ion deposition morphology, thereby inhibiting the massive growth of sodium dendrites. In the electrochemical apparatus of the present application, the sodium salt in the electrolyte solution is not particularly limited, and the sodium salt may be a sodium salt commonly used for the electrolyte solution in the art. As an example, the sodium salt can be selected from at least one of sodium hexafluorophosphate, sodium bis(fluorosulfonyl)imide, sodium bis(trifluoromethanesulfonyl)imide, sodium trifluoromethanesulfonate, sodium tetrafluoroborate, sodium difluorophosphate, sodium perchlorate, and sodium chloride.

In the electrochemical apparatus of the present application, in order to improve the performance of the electrolyte solution, a suitable additive may also be added to the electrolyte solution.

The use of the electrochemical apparatus of the present application is not particularly limited, which may be used in any electronic device known in the art. In some embodiments, the electrochemical apparatus of the present application may be used in, but not limited to, laptop computer, pen-input computer, mobile computer, e-book player, portable telephone, portable fax machine, portable copier, portable printer, stereo headphone, video recorder, LCD television, portable cleaner, portable CD player, mini CD, transceiver, electronic notepad, calculator, memory card, portable audio recorder, radio, backup power source, motor, automobile, motorcycle, power assisted cycle, bicycle, lighting apparatus, toy, game console, clock, power tool, flash, camera, large battery for home use, energy storage and sodium-ion capacitor, etc.

The following examples describe the disclosure of the present application in more detail and are provided for illustrative purposes only, as various modifications and changes within the scope of the disclosure of the present application will be apparent to those skilled in the art. Unless otherwise stated, all parts, percentages, and ratios reported in the following examples are on a weight basis, and all reagents used in the examples are commercially available or may be obtained by synthesis according to conventional methods, and may be directly used without further treatment, and the instruments used in the examples are commercially available.

Example 1

(1) Preparation of negative electrode: A negative electrode was prepared by using an aluminum foil with a thickness of 12 μm as a negative electrode current collector, and the roughness of the negative electrode current collector was 0.5 μm.

(2) Preparation of positive electrode: $NaFeP_2O_7$ as a positive electrode active material, polyvinylidene fluoride (PVDF) as a binder, and conductive carbon black (Super-P) as a conductive agent were mixed well in a mass ratio of 96%:2%:2% in N-methylpyrrolidone (NMP) as a solvent to prepare a positive electrode slurry, which was coated on the surface of aluminum foil according to the mass requirements of positive electrode active material per unit area by extrusion coater and dried, and the coated sheet was then cold pressed at a design compress density of 2.5 g/cm$^3$ by a cold press to prepare the final positive electrode sheet, wherein the positive electrode material and coating mass in each example were shown in Table 1.

(3) Preparation of electrolyte solution: The electrolyte solution with a concentration of 1 mol/L was obtained by dissolving $NaPF_6$ in a mixed solvent of diethylene glycol dimethyl ether/tetraethylene glycol dimethyl ether in a volume ratio of 1:1.

(4) Assembly of the battery: Button-type batteries were used to evaluate the electrical properties of materials such as gram capacity and initial coulombic efficiency of positive electrode materials. The positive electrode sheets were punched and cut into small discs with a diameter of 14 mm using a punch, and the weight of each positive electrode sheet was weighed using a balance. In a drying chamber, a negative electrode in the form of small disc, a separator (model: Celgard 2300), a sodium sheet (16 mm in diameter) and a button-type battery case were assembled into a button-type half battery, and an electrolyte solution with a concentration of 1 mol/L formed by dissolving $NaPF_6$ in a mixed solvent of diethylene glycol dimethyl ether/tetraethylene glycol dimethyl ether in a volume ratio of 1:1 was added dropwise, which were finally encapsulated by using a button-type battery packaging machine to obtain a button-type half battery.

(5) Assembly of full battery

A full battery is used to test the energy density and cycling performance of the battery cell. The positive electrode and negative electrode sheets and separator were cut into corresponding sizes, wound into dry battery cells by winding machine, and then subjected to the standard processes such as welding, aluminum-plastic film encapsulation, liquid injection, formation, gas extraction, secondary encapsulation and volume calibration to prepare a 10 Ah soft pack sodium metal battery. Among them, the injection volume of the electrolyte solution was set as 3 g/Ah.

Examples 2 to 3 and Comparative Examples 1 to 2

Unlike Example 1, the design value of the battery cell was changed by adjusting the initial coulombic efficiency of the battery cell, as detailed in Table 1 below.

Example 4 and Comparative Examples 3 to 4

Unlike Example 1, the design value of the battery cell was changed by adjusting the coating mass of the active material, as detailed in Table 1 below.

Examples 5 to 8 and Comparative Examples 5 to 6

Unlike Example 1, the roughness of the negative electrode current collector was adjusted.

Examples 9 to 11 and Comparative Examples 7 to 8

Unlike Example 1, the conductive coating was added and the thickness of the conductive coating was adjusted.

TABLE 1

List of positive electrode and negative electrode parameters of battery cells in each Example/Comparative Example

| No. | Positive electrode material | Initial charge capacity (mAh/g) | Initial discharge capacity (mAh/g) | Initial coulombic efficiency | Coating mass of active material/ g/cm$^2$ | Design value | Negative electrode current collector | Thickness of conductive layer (mm) | Roughness of negative electrode current collector (um) |
|---|---|---|---|---|---|---|---|---|---|
| Example 1 | NaFeP$_2$O$_7$ | 100 | 82 | 82.0% | 0.03 | 4799 | 12 μm Al | / | 0.5 |
| Example 2 | NaFeP$_2$O$_7$ | 100 | 85 | 85.0% | 0.03 | 3999 | 12 μm Al | / | 0.5 |
| Example 3 | Na$_4$Fe$_3$(PO$_4$)$_2$P$_2$O$_7$ | 110 | 105 | 95.5% | 0.03 | 1333 | 12 μm Al | / | 0.5 |
| Example 4 | NaFeP$_2$O$_7$ | 100 | 82 | 82.0% | 0.02 | 3199 | 12 μm Al | / | 0.5 |
| Example 5 | NaFeP$_2$O$_7$ | 100 | 82 | 82.0% | 0.03 | 4799 | 12 μm Al | / | 0.3 |
| Example 6 | NaFeP$_2$O$_7$ | 100 | 82 | 82.0% | 0.03 | 4799 | 12 μm Al | / | 1.0 |
| Example 7 | NaFeP$_2$O$_7$ | 100 | 82 | 82.0% | 0.03 | 4799 | 12 μm Al | / | 1.2 |
| Example 8 | NaFeP$_2$O$_7$ | 100 | 82 | 82.0% | 0.03 | 4799 | 12 μm Al | / | 1.5 |
| Example 9 | NaFeP$_2$O$_7$ | 100 | 82 | 82.0% | 0.03 | 4799 | 12 μm Al + conductive carbon coating | / | 0.5 |
| Example 10 | NaFeP$_2$O$_7$ | 100 | 82 | 82.0% | 0.03 | 4799 | 12 μm Al + conductive carbon coating | 5 | 0.5 |
| Example 11 | NaFeP$_2$O$_7$ | 100 | 82 | 82.0% | 0.03 | 4799 | 12 μm Al + conductive carbon coating | 10 | 0.5 |
| Comparative Example 1 | Na$_4$Fe$_3$(PO$_4$)$_2$P$_2$O$_7$/CNT | 115 | 114 | 99.1% | 0.03 | 267 | 12 μm Al | / | 0.5 |
| Comparative Example 2 | NaCoP$_2$O$_7$ | 100 | 78 | 78% | 0.03 | 5866 | 12 μm Al | / | 0.5 |
| Comparative Example 3 | NaFeP$_2$O$_7$ | 100 | 82 | 82.0% | 0.04 | 6399 | 12 μm Al | / | 0.5 |
| Comparative Example 4 | NaFeP$_2$O$_7$ | 100 | 82 | 82.00% | 0.005 | 800 | 12 μm Al | / | 0.5 |
| Comparative Example 5 | NaFeP$_2$O$_7$ | 100 | 82 | 82.0% | 0.03 | 4799 | 12 μm Al | / | 0.2 |
| Comparative Example 6 | NaFeP$_2$O$_7$ | 100 | 82 | 82.0% | 0.03 | 4799 | 12 μm Al | / | 1.8 |

TABLE 1-continued

List of positive electrode and negative electrode parameters of battery cells in each Example/Comparative Example

| No. | Positive electrode material | Initial charge capacity (mAh/g) | Initial discharge capacity (mAh/g) | Initial coulombic efficiency | Coating mass of active material/ g/cm$^2$ | Design value | Negative electrode current collector | Thickness of conductive layer (mm) | Roughness of negative electrode current collector (um) |
|---|---|---|---|---|---|---|---|---|---|
| Comparative Example 7 | NaFeP$_2$O$_7$ | 100 | 82 | 82.0% | 0.03 | 4799 | 12 μm Al + conductive carbon coating | 0.8 | 0.5 |
| Comparative Example 8 | NaFeP$_2$O$_7$ | 100 | 82 | 82.0% | 0.03 | 4799 | 12 μm Al + conductive carbon coating | 12 | 0.5 |

Performance Test (1) Gram capacity test of positive electrode material:

A battery tester was used to evaluate the electrochemical performance of the battery cells by performing charge-discharge tests on the positive electrode materials of button-type battery cells. The charge-discharge voltage was set as 2.5 V to 3.65 V, and the charge-discharge current was set as 50 mA/g. The initial charge-discharge capacity of the battery was read. The charge-discharge gram capacity of the positive electrode material was calculated by the following formula:

Charge (discharge) gram capacity =

$$\frac{\text{Charge (discharge) capacity}}{\text{Mass of active material in positive electrode sheet}}$$

Mass of active material in positive electrode sheet =

(mass of positive electrode sheet – aluminum foil mass) * ratio of positive electrode active material (2) Full battery test:

A battery tester was used to evaluate the electrochemical performance of the battery cells by performing charge-discharge tests on the battery cells. The charge-discharge voltage was set as 2.5 V to 3.65 V, the charge-discharge current was set as 1 A (0.1 C), and the corresponding battery cell capacity and average voltage platform when the battery cell was discharged from 3.65 V to 2.5 V were recorded after the initial charge-discharge and 200 charge-discharge cycles. The weight of the battery cell was measured using an electronic balance with an accuracy of one thousandth, and the weight energy density, volumetric energy density and capacity retention rate of the battery cell after 200 cycles were calculated by the following formula.

Weight energy density =

$$\frac{\text{Battery cell discharge capacity after initial charge/discharge} * \text{Average voltage platform}}{\text{Weight of battery cell}}$$

Capacity retention rate after 200 cycles =

$$\frac{\text{Battery cell discharge capacity at cycle 200}}{\text{Battery cell discharge capacity after initial charge/discharge}} * 100\%$$

(3) Sodium deposition thickness test:

The battery cells after the initial charge-discharge were disassembled, the negative electrode interface was observed by SEM, the sodium deposition layer (sodium content ≥80%) was determined by EDS, and the thickness of the layer was measured.

(4) Deposition overpotential test:

The battery cells after the initial charge-discharge were disassembled, the negative electrode sheet was removed, punched, and assembled into a button-type half battery with the separator, sodium sheet, and electrolyte solution. The discharge voltage of the button-type battery was set as −100 mV vs Na/Na$^+$, and the current density was set as 1 mA/cm$^2$. The lowest voltage point in the capacity-discharge voltage curve was read, which was the overpotential of the sodium deposition on the negative electrode sheet. The above test results were shown in Table 2.

TABLE 2

List of battery cell performance data in each Example/Comparative Example

| No. | Sodium deposition thickness after the initial charge-discharge/nm | Deposition overpotential at cycle 2/mV | battery cell energy density (Wh/kg) | Capacity retention rate after 200 cycles |
|---|---|---|---|---|
| Example 1 | 230 | 23 | 134.4 | 81.5% |
| Example 2 | 208 | 22 | 136.2 | 82.70% |
| Example 3 | 57 | 18 | 159.3 | 84.8% |
| Example 4 | 153 | 21 | 128.7 | 83.20% |

TABLE 2-continued

List of battery cell performance data in each Example/Comparative Example

| No. | Sodium deposition thickness after the initial charge-discharge/nm | Deposition overpotential at cycle 2/mV | battery cell energy density (Wh/kg) | Capacity retention rate after 200 cycles |
| --- | --- | --- | --- | --- |
| Example 5 | 231 | 23 | 134.2 | 81.10% |
| Example 6 | 232 | 23 | 134.1 | 82.20% |
| Example 7 | 230 | 23 | 133.9 | 82.70% |
| Example 8 | 229 | 23 | 134.5 | 83.20% |
| Example 9 | 228 | 16 | 133.9 | 86.7% |
| Example 10 | 229 | 14 | 128.4 | 87.50% |
| Example 11 | 230 | 13 | 122.3 | 88.20% |
| Comparative Example 1 | 13 | 32 | 172.9 | 71.4% |
| Comparative Example 2 | 282 | 24 | 129.2 | 79.80% |
| Comparative Example 3 | 310 | 25 | 137.1 | 72.3% |
| Comparative Example 4 | 33 | 27 | 94.3 | 78.40% |
| Comparative Example 5 | 228 | 23 | 133.6 | 77.30% |
| Comparative Example 6 | 232 | 22 | 134.5 | 78.60% |
| Comparative Example 7 | 228 | 22 | 134 | 82.10% |
| Comparative Example 8 | 229 | 13 | 109.6 | 88.10% |

From the comparison of Examples 1 to 4 and Comparative Examples 1 to 4, it may be seen that the positive electrode materials with different coulomb efficiencies were selected and the coating mass was controlled, so that there was a certain thickness of sodium deposition layer on the surface of the negative electrode after the battery cell is charged and discharged for the first time, the deposition overpotential of the negative electrode decreased significantly during the subsequent charge process, and the sodium deposition was more uniform, which were beneficial to improve the cycling performance of the battery cell. When the positive electrode material with a higher initial coulombic efficiency (Comparative Example 1) was selected, even if the coating mass was higher, the thickness of sodium deposition after the initial charge-discharge process was not enough to form a uniform layer of sodium deposition, the deposition overpotential of the negative electrode was higher, and the cycling performance of the battery cell decreased significantly. When the positive electrode material with a lower initial coulombic efficiency (Comparative Example 2), the cycling performance of the battery cell was improved, but the energy density of the battery cell was lower and the practicability was poor. When a thicker sodium deposition layer was obtained by a high coating mass (Comparative Example 3), the deposition overpotential of the negative electrode decreased, but the excessive thickness of the sheet not only had the problem of powder dropping during the processing/winding process, but also hindered the electrolyte solution infiltration, and thus the cycling performance of the battery cell failed to obtain a significant improvement. When the coating mass was little (Comparative Example 4), the thickness of the sodium deposition was not enough to reduce the deposition overpotential, the cycling performance of the battery cell was not improved significantly, which are not conducive to the improvement of the energy density of the battery cell.

From the comparison of Examples 5 to 8 and Comparative Examples 5 to 6, it can be seen that the surface roughness of the aluminum-based current collector was controlled within the range limited in Examples 5 to 8 to ensure a good bond between the deposited sodium and the aluminum-based current collector. When the surface roughness of the aluminum-based current collector was too little (Comparative Example 5), there would be uneven sodium deposition at the local tip of the current collector, which would easily form sodium dendrites and aggravate the side reaction with the electrolyte solution, leading to the degradation of the electrical performance of the battery cell and the safety risk about short circuit.

From the comparison of Examples 9 to 11 and Comparative Examples 7 to 8, it can be seen that the conductive coating was coated on the surface of the aluminum-based current collector so that the thickness of the conductive coating was controlled within the optional range of the present application (Examples 9 to 11), the sodium deposition overpotential may be further reduced, and the cycling performance of the battery cell was further improved. When the thickness of the conductive coating was too low (Comparative Example 7), it is difficult for the conductive coating to cover all the current collectors, resulting in a high local nucleation energy in the uncovered area and an indistinctive effect of reducing the overall deposition overpotential. When the thickness of the conductive coating was too high (Comparative Example 8), it is not conducive to the improvement of the energy density of the battery cell.

In view of the above, the present application utilizes the first irreversible capacity of the positive electrode material and the optimization of the battery cell design. After the battery cell is charged and discharged for the first time, the amount of residual sodium metal is sufficient to uniformly form a sodium deposition layer with a certain thickness on the surface of the current collector. The higher nucleation energy required for the deposition of sodium onto the surface of the current collector during subsequent charge-discharge cycles is avoided, the overall deposition overpotential is reduced, and the deposition uniformity of sodium metal and the reversibility of the charge-discharge process are ensured.

The above descriptions are merely preferred examples of the present application, and are not intended to limit the present application. Any modifications, equivalent replacements, improvements, etc. made within the spirit and principle of the present application shall be included within the scope of protection of the present application.

What is claimed is:

1. A sodium metal battery, comprising a positive electrode plate and a negative electrode plate, wherein the negative electrode plate is a negative current collector, a sodium layer deposited on the negative current collector, the thickness of the sodium layer deposited in situ on the negative current collector after the first charge and discharge of the battery is ≥34 nm, wherein the initial charging capacity of a positive electrode active substance in the positive electrode plate is $Q_C$ mAh/g, the initial discharge capacity is $Q_D$ mAh/g the coating mass of the positive electrode active substance is $C_W$ g/cm², and the theoretical volumetric capacity of sodium metal is X mAh/cm³, which satisfies the following formula:

$$1333 \leq \frac{(Q_C - Q_D) * C_W}{X} * 10^7 \leq 4799, \quad (I)$$

at least a portion of the surface of the negative electrode current collector is provided with a conductive coating, and the thickness of the conductive coating is 1 μm~10 μm, the surface roughness of the negative current collector is 0.3 μm~1.5 μm.

2. The battery according to claim 1, wherein the negative electrode current collector comprises an aluminum based current collector, and the aluminum based current collector comprises at least one of the following technical features:
   (1) the aluminum based current collector is aluminum foil or aluminum alloy foil;
   (2) the aluminum based collector is an aluminum based composite collector, which includes a polymer base film and aluminum foil and/or aluminum alloy foil formed on both sides of the polymer base film;
   (3) the aluminum based collector is an aluminum based composite fluid collector, which includes a polymer base film and aluminum foil and/or aluminum alloy foil formed on both sides of the polymer base film wherein the polymer base film is any one of polyamide, polyethylene terephthalate, polyimide, polyethylene, polypropylene, polystyrene, polyvinyl chloride, acrylonitrile butadiene styrene copolymer, polyethylene terephthalate, polyethylene terephthalate, epoxy resin, phenolic resin, polytetrafluoroethylene, polyvinylidene fluoride, silicone rubber, or polycarbonate.

3. The battery according to claim 1, wherein the conductive coating comprises a conductive agent and a binder, wherein the conductive agent comprises at least one of metal, conductive carbon, conductive polymer, and conductive ceramic material.

4. The battery according to claim 3, wherein the conductive coating comprises at least one of the following technical features:
   (5) The metal has a body centered cubic structure, comprising any one of α-Fe, V, Nb, Cr, Mo, Ta, and W;
   (6) the conductive carbon comprises at least one of conductive carbon black, graphite, carbon fiber, single walled carbon nanotubes, multi walled carbon nanotubes, graphene, and fullerene;
   (7) the conductive polymer comprises any one of polyaniline, polythiophene, polypyrrole, or polyacetylene;
   (8) the conductive ceramic material comprises at least one of $TiB_2$, TiC, and $B_4C_3$;
   (9) the adhesive comprises any one of polyvinylidene fluoride, sodium carboxymethyl cellulose, butadiene styrene rubber, sodium alginate, lithium polyacrylate, sodium polyacrylate, polytetrafluoroethylene, polyimide, or polyurethane; and
   (10) the mass ratio of the adhesive to the conductive agent is 1: (1-30).

5. The battery according to claim 1, wherein the conductive coating is formed by any one of the methods of transfer coating, extrusion coating, and spraying.

6. The battery according to claim 1, wherein the positive electrode active substance comprises at least one of sodium transition metal oxide, polyanionic compound, and Prussian blue compound.

7. A battery according to claim 1, wherein the initial coulombic efficiency of the battery is 80% to 99%.

8. An electrochemical device, comprising the battery according to claim 1.

* * * * *

UNITED STATES PATENT AND TRADEMARK OFFICE
CERTIFICATE OF CORRECTION

| | | |
|---|---|---|
| PATENT NO. | : 12,456,736 B2 | Page 1 of 1 |
| APPLICATION NO. | : 18/338530 | |
| DATED | : October 28, 2025 | |
| INVENTOR(S) | : Yuqun Zeng | |

It is certified that error appears in the above-identified patent and that said Letters Patent is hereby corrected as shown below:

On the Title Page

Please add the Foreign Application Priority Data:
"June 26, 2021 (CN) 202110742607.7".

Signed and Sealed this
Twenty-third Day of December, 2025

John A. Squires
*Director of the United States Patent and Trademark Office*